United States Patent
Costa et al.

(10) Patent No.: US 9,362,781 B2
(45) Date of Patent: Jun. 7, 2016

(54) UNINTERRUPTIBLE POWER SUPPLY SYSTEM WITH FAST TRANSFER FOR UNDERVOLTAGE SOURCE LINE FAILURES

(71) Applicant: Chloride Srl, Castel Guelfo (IT)

(72) Inventors: Pier Ugo Costa, Imola (IT); Marco Bonora, San Lazzaro di Savena (IT); Graziano Galuppi, Imola (IT)

(73) Assignee: Chloride Srl, Castel Guelfo (IT)

( * ) Notice: Subject to any disclaimer, the term of this patent is extended or adjusted under 35 U.S.C. 154(b) by 589 days.

(21) Appl. No.: 13/804,784

(22) Filed: Mar. 14, 2013

(65) Prior Publication Data
US 2014/0097690 A1    Apr. 10, 2014

Related U.S. Application Data

(60) Provisional application No. 61/700,910, filed on Sep. 14, 2012.

(51) Int. Cl.
*H02J 9/00* (2006.01)
*H02J 9/06* (2006.01)

(52) U.S. Cl.
CPC . *H02J 9/00* (2013.01); *H02J 9/061* (2013.01); *H02J 9/062* (2013.01); *H02J 2009/068* (2013.01); *Y10T 307/615* (2015.04); *Y10T 307/76* (2015.04)

(58) Field of Classification Search
CPC ............. H02J 9/00; H02J 9/061; H02J 9/062; H02J 2009/068; Y10T 307/76; Y10T 307/615
USPC ........................................................ 307/64
See application file for complete search history.

(56) References Cited

U.S. PATENT DOCUMENTS

| | | | |
|---|---|---|---|
| 4,400,624 A | 8/1983 | Ebert, Jr. | |
| 5,182,464 A * | 1/1993 | Woodworth | H02J 9/06 307/64 |
| 6,295,215 B1 | 9/2001 | Faria et al. | |
| 2006/0119184 A1* | 6/2006 | Chen | H02J 9/062 307/66 |
| 2010/0054002 A1 | 3/2010 | Lu et al. | |
| 2011/0278933 A1 | 11/2011 | Anderson et al. | |

FOREIGN PATENT DOCUMENTS

| | | |
|---|---|---|
| EP | 1160965 A2 | 12/2001 |
| GB | 2111326 A | 6/1983 |
| WO | WO-9212562 A1 | 7/1992 |

OTHER PUBLICATIONS

Notification of Transmittal of International Search Report and Written Opinion of the International Application for PCT/IB2013/058548, mailed Oct. 1, 2014.

* cited by examiner

*Primary Examiner* — Thienvu Tran
*Assistant Examiner* — Kevin J Comber
(74) *Attorney, Agent, or Firm* — Harness, Dickey & Pierce, P.L.C.

(57) ABSTRACT

A UPS system may be operated selectively in either a high efficiency mode or a low efficiency mode. An inductor is connected in series between the transfer switch and a secondary power source. The transfer switch includes thyristors arranged in a reverse connected configuration. A controller synchronizes gate commands to the thyristors in order to synchronize reserve voltage introduced by the inverter. If the load currents are not in phase with a fundamental voltage of the secondary power source, the controller waits up to a first time period in order to estimate when current through the switches will reach zero. If the out of phase current will reach zero by the end of a second time period, the inverter is switched on at the end of the second time period.

30 Claims, 4 Drawing Sheets

UNINTERRUPTIBLE POWER SUPPLY SYSTEM WITH FAST TRANSFER FOR UNDERVOLTAGE SOURCE LINE FAILURES

CROSS-REFERENCE TO RELATED APPLICATIONS

This application claims the benefit of U.S. Provisional Application No. 61/700,910, filed on Sep. 14, 2012. The entire disclosure of the above application is incorporated herein by reference.

FIELD

The present disclosure relates to uninterruptible power supply systems, and more particularly, to an uninterruptible power supply system having a fast transfer for low impedance line failures.

BACKGROUND

This section provides background information related to the present disclosure which is not necessarily prior art.

FIG. 1 is a simplified schematic of a typical prior art UPS system 100. The basic elements of UPS system 100 are rectifier 102, inverter 104, a DC power source such as battery 106, a controller 108, and a static transfer switch 110. Battery 106 may be coupled through a boost circuit 107 to an input 105 of inverter 104, which is also coupled to an output 103 of rectifier 102. An input 114 of rectifier 102 is coupled through disconnect switch 116 to a primary power source 115 of power, typically an AC feed from a utility. An input 118 of static transfer switch 110 is coupled through disconnect switch 120 to a secondary power source 122 of power, typically an AC feed from a utility, and an output 124 of static transfer switch 110 is coupled to an output 126 of inverter 104. Output 126 of inverter 104 is coupled through a disconnect switch 128 to output 112 of UPS system 100. Output 112 of UPS system 100 is coupled through a manual bypass switch 130 to secondary power source 122. It should be understood that primary power source 115 and secondary power source 122 can be different power sources or the same power source, such as the same utility feed coupled to both disconnect switches 116, 120. Static transfer switch 110 is used to switch load 134 connected to an output 112 of UPS system 100 to secondary power source 122. In this regard, when static transfer switch 110 is closed, the load is connected to secondary power source 122 and when static transfer switch is open, the load is disconnected from secondary power source 122 (unless manual bypass switch 130 has been closed).

Controller 108 controls UPS system 100 including controlling inverter 104 by varying the duty cycle of the switching devices in inverter 104 so that inverter 104 provides a desired output voltage. Controller 108 also controls static transfer switch 110 to cause it to switch between closed and open. Controller 108 can be, be part of, or include: an Application Specific Circuit (ASIC); an electronic circuit; a combinational logic circuit; a field programmable gate array (FPGA); and/or a processor such as a Digital Signal Processor (DSP), microcontroller, or the like. It should be understood that controller 108 may include one or more than one of the foregoing, such as digital controller based on DSPs that control each of the functional blocks of UPS system 100 by generating the proper switching signals to switch the power semiconductors such as IGBTs and thyristors.

Rectifier 102 may be a three phase rectifier having three full rectification legs (and may use power switching devices such as IGBTs), one for each phase, and inverter 104 may be a three phase inverter having three inverter legs, one for each phase. Rectifier 102 and inverter 104 are configured in a double conversion path with UPS system 100 thus being a double conversion UPS.

Static transfer switch 110 is typically implemented with power semiconductor switching devices. One type of power semiconductor switching device used in implementing static transfer switches is the thyristor since it is a very robust device, is relatively inexpensive, and has low losses. Typically, a static transfer switch implemented with thyristors has a pair of reverse connected thyristors 132 for each phase. That is, if UPS system 100 is a three phase system, static transfer switch 110 would have three pairs of reverse connected thyristors 132, one for each phase. It should be understood that each thyristor 132 may include a plurality of parallel connected thyristors 132 to provide the requisite power handling capability.

One drawback of static transfer switches implemented with thyristors is that thyristors only turn off when the current passing through them is zero. Consequently, when the static transfer switch is used to switch the load between two sources, it is necessary to take into account the possibility of paralleling the two power sources for up to half the period of the power sources (for example, 10 msec in the case of 50 Hz power sources and 8.32 msec in the case of 60 Hz power sources).

Paralleling the two power sources has two potential drawbacks: (a) an uncontrolled current passes between the two power sources via the static switches, and (b) when the two power sources are in parallel, the output waveform depends on the output voltage, the two power sources and their output impedance.

In the STS (static transfer switch) applications in which thyristors are used, dedicated solutions are implemented to avoid paralleling the power sources, an important objective. This results in a transfer delay of up to half the period of the power sources.

In UPS applications, the inverter has a current limited capacity. Therefore, an important objective is to reduce the length of time the two power sources are in parallel to a minimum in order to supply the load with the best quality voltage waveform.

In both these applications (STS and UPS), transfer between the two power sources is usually due to power quality disturbances on the power source supplying the load. Undervoltages (interruptions/sags) are the most probable root causes of these disturbances.

All the time that the current through the thyristor is in phase with the power source voltage, transferring the load to the second power source (synchronized with the first one) when an undervoltage is detected forces the current to go to zero, thus reducing the time the two power sources are in parallel to less than 1 ms and eliminating any overcurrent between the two.

A problem arises when, at the instant of the transfer, the load current is not in phase with the power source voltage (inductive or capacitive power factor). In this case, the two power sources may be in parallel at an uncontrolled current and the disturbance may persist at the output of the UPS for up to half the period of the power sources.

When the second power source is an inverter, as is the case with a UPS, a possible solution would be to modify the inverter voltage waveform in such a way as to reduce the current quickly to zero. However, this means having an inverter with a very high current capacity and causes strong voltage oscillation on the load.

The IEC has defined three UPS topologies in its standard #62040-3. These are defined by the relationships and dependencies (or lack thereof) between input and output voltage and frequency characteristics. The three topologies are:

a). VFI—Voltage and Frequency of the Output are Independent of Input Voltage and Frequency—this is only possible if they are generated independently, as in a double conversion mode or topology.

b). VFD—Voltage and Frequency of the Output are Dependent on the Input. This is true if there is no voltage regulation or independent generation of the output, which identifies a standby or offline mode. There can be some passive filtering, but no active power correction.

c). VI—Voltage of the Output is Independent of Input (Frequency In=Out). This is descriptive of line interactive mode or topology.

UPS system 100 can be operated in these three modes. In the VFD mode, static transfer switch 110 is closed and the load is connected to the input source voltage through static transfer switch 110. Inverter 104 is off and rectifier 102 is used only to charge battery 106. In the VI mode, UPS system 100 is operating as a line interactive UPS with static transfer switch 110 closed and the load is connected to the input source voltage through static transfer switch 110. Inverter 104 is operated as an active filter (current source) by controller 108 to compensate for reactive and harmonic load currents. In the VFI mode, UPS system 100 is operating as a double conversion UPS. In this mode, static transfer switch 110 is open and the input source voltage is converted to DC by rectifier 102 and back to AC by inverter 104.

SUMMARY

This section provides a general summary of the disclosure, and is not a comprehensive disclosure of its full scope or all of its features.

In accordance with an aspect of the present disclosure, a UPS system that is switchable between a higher efficiency mode and a low efficiency mode. The higher efficiency mode is either a VFD mode or a VI mode. The lower efficiency mode is a VFI mode, has a bypass switch with thyristors. The UPS system has an inverter and a controller. An inductor is connected in series between the thyristors and a secondary power source. When an undervoltage is detected on the secondary power source, the UPS system is switched from the higher efficiency mode, either the VFD mode or VI mode, to the VFI mode. In switching the UPS system to the VFI mode, the controller synchronizes thyristor gate commands for the thyristors with the reserve voltage, and a slightly leading phase compensation introduced by the inverter. If all the load currents are not in phase with a fundamental voltage of the secondary power source, the controller waits up to a first period of time in order to estimate when a current through a thyristor corresponding to the out of phase current will reach zero. Should this estimation determine that the out of phase current will reach zero by the end of a second period of time, the corresponding inverter phase is switched on at the end of the second period of time. However, if the estimation determines that the current will take more than the second period of time to reach zero, at the end of the first period of time the controller controls the applicable phase of the inverter for the second time period to provide a counter voltage in order to attempt to turn off the applicable thyristor. The inductor limits the current in the inverter phase being operated to provide the counter voltage while that inverter phase generates the counter voltage to un-polarize the applicable thyristor. After the end of the second time period, the controller operates the inverter to provide the nominal voltage waveform.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
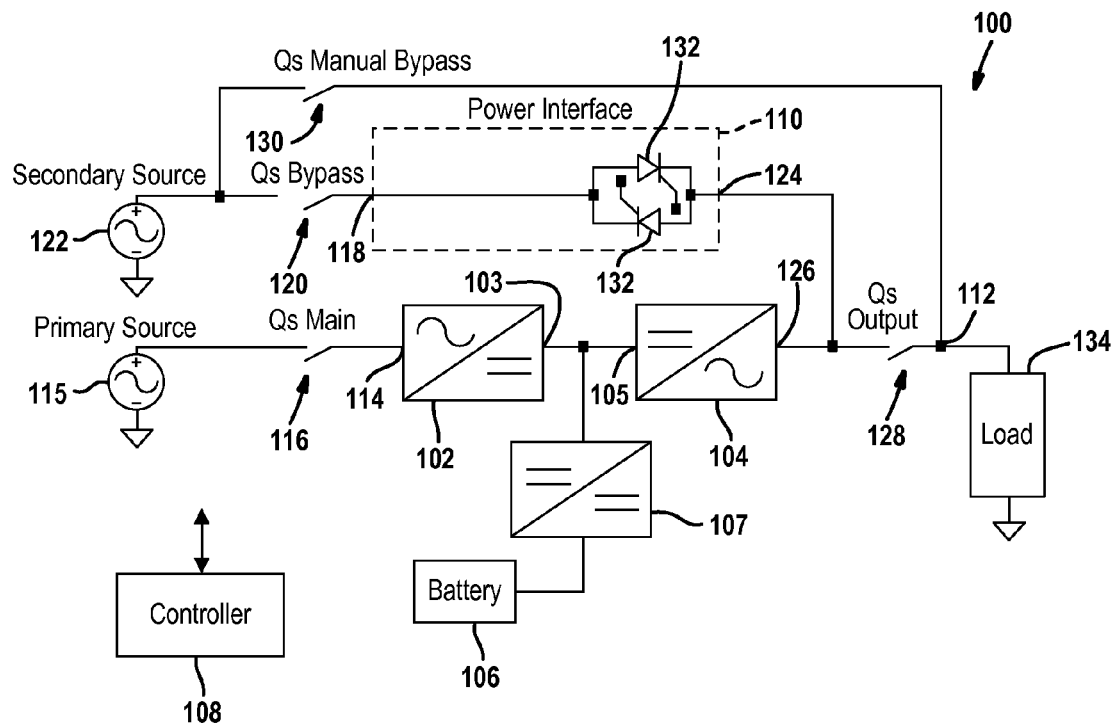
FIG. 1 is a simplified schematic of a prior art UPS system.
Figure 2:
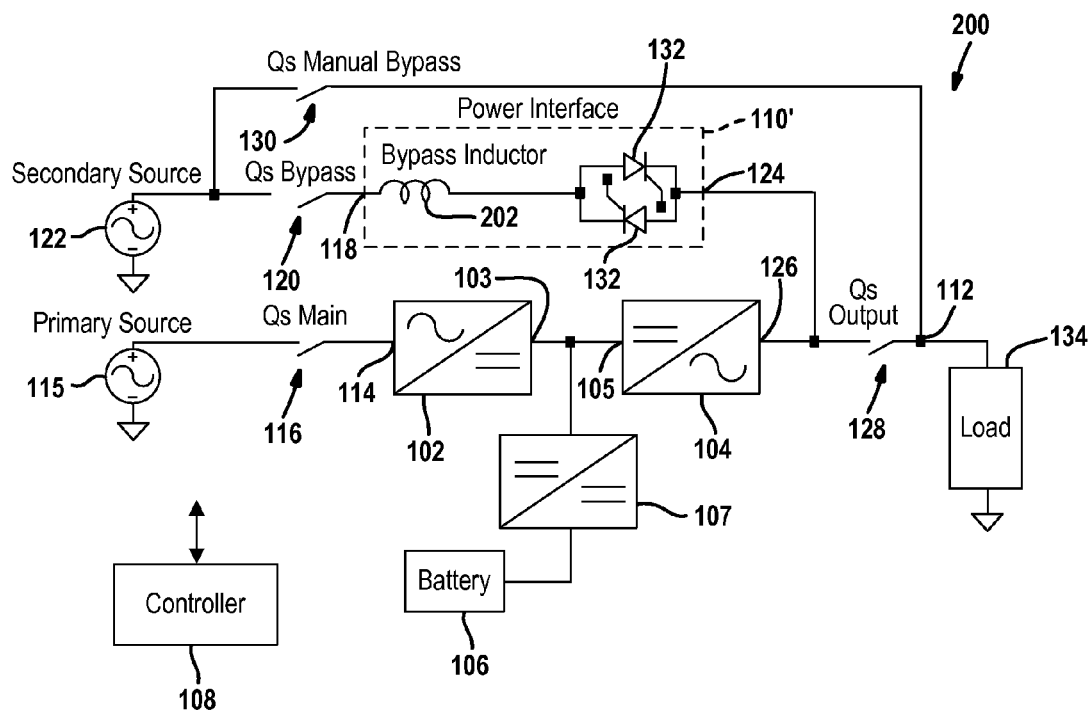
FIG. 2 is a simplified schematic of a UPS system in accordance with an aspect of the present disclosure.

With reference to FIG. 2, in accordance with an aspect of the present disclosure, a UPS system 200 is shown switchable between a higher efficiency mode and a low efficiency mode. The higher efficiency mode is either a VFD mode or a VI mode. The low efficiency mode is a VFI mode. The main differences between UPS system 200 and UPS system 100 is the addition of inductor 202 connected in series between input 118 of static transfer switch 110' and thyristors 132, and the control of static transfer switch 110 when switching UPS system 200 from the higher efficiency mode to the VFI mode. The discussion of UPS system 200 will thus focus on these differences. While inductor 202 is shown as part of static transfer switch 110', it should be understood that it could be separate from static transfer switch 110'. For example, inductor 202 could be a separate element connected in series between input 118 of static transfer switch 110 and disconnect switch 120.

In accordance with an aspect of the present disclosure, UPS system 200 is controlled by controller 108 to minimize transfer time from the higher efficiency mode to the VFI mode. The control by controller 108 is based on continuously monitoring input parameters of secondary power source 122, particularly, voltage, current and frequency. Controller 108 decides based on predetermined limits, illustratively under-voltage limits, to quickly transfer UPS system 200 from the higher efficiency mode to the VFI mode in the event of an undervoltage on secondary power source 122 to minimize the effect of the under-voltage on load 134.

When UPS system 200 is operating in either the VFD or VI mode, static transfer switch 110' is closed and secondary power source 122 provides the primary power source of power to load 134 through static transfer switch 110'. The main difference between the VFD mode and the VI mode is that when UPS system 200 is in the VFD mode, the inverter 104 is off. When UPS system 200 is in the VI mode, inverter 104 is operated as an active filter (current source) in parallel with secondary power source 122 in order to compensate the cou so that the current through the thyristors is always in phase with the source voltage. This compensates for reactive and harmonic currents. When a power quality disturbance is detected on secondary power source 122, the UPS system 200 is switched to the VFI mode. In accordance with an aspect of the present disclosure, the transfer time between either the VI or VFD modes to the VFI mode is $T_1+T_2$ in accordance with the switching method described below.

VI Mode to VFI Mode

When controller 108 of UPS system 200 detects an under-voltage, it gates off all the thyristors 132 in static transfer switch 110', changes the state of the inverter 104 from a current source to a voltage source and, if all the load currents are in phase with the relative fundamental voltage (the voltage of secondary power source 122), turns the inverter power on.

Possible mistakes in the phase compensation could make it difficult to achieve this aim (maintaining the current in phase with the voltage on static transfer switch 110'. This problem is overcome by implementing thyristor gate commands for thyristors 132 of static transfer switch 110' that are synchronized with the reserve voltage, and a slightly leading phase compensation introduced by the inverter, rather than a purely resistive one on the static transfer switch 110'. The latter means the current leads the voltage at a small phase angle in static transfer switch 110'.

If, due to the under voltage on secondary power source 122, the current in the same phases is not in the right direction (i.e., not in phase), controller 108 waits up to a first time period $T_1$ in order to estimate when the current in a phase through the thyristor 132 corresponding to the out of phase current will reach zero. Should this estimation determine that the out of phase current will reach zero by the end of a second time period $T_2$, the inverter phases will be switched on at the end of the time period $T_1+T_2$. However, if the estimation determines that the current will take more than time $T_2$ to reach zero, at the end of the time $T_1$ controller 108 controls the applicable phase of inverter 104 for the time $T_2$ to provide a counter voltage in order to attempt to turn off the applicable thyristor 132. Inductor 202 in series with the thyristors 132 of each phase in static transfer switch 110' limits the current in the inverter phase being operated to provide the counter voltage while that inverter phase generates the counter voltage to un-polarize the applicable thyristor 132. After the end of the second time period, controller 108 operates inverter 104 to provide the nominal voltage waveform with all inverter phases being switched accordingly.

VFD Mode to VFI Mode

When controller 108 of UPS system 200 detects an under-voltage, it gates off all the thyristors 132 in static transfer switch 110', changes the state of the inverter 104 (which was off) to a voltage source and, if all the load currents are in phase with the relative fundamental voltage (the voltage of secondary power source 122), turns the inverter power on. Switching from the VFD Mode to the VFI Mode is essentially the same as switching from the VI Mode to the VFI Mode with the exception that the change in state of the inverter in the VFD Mode is from off to a voltage source as opposed to a change from a current source to a voltage source.

Figure 3:
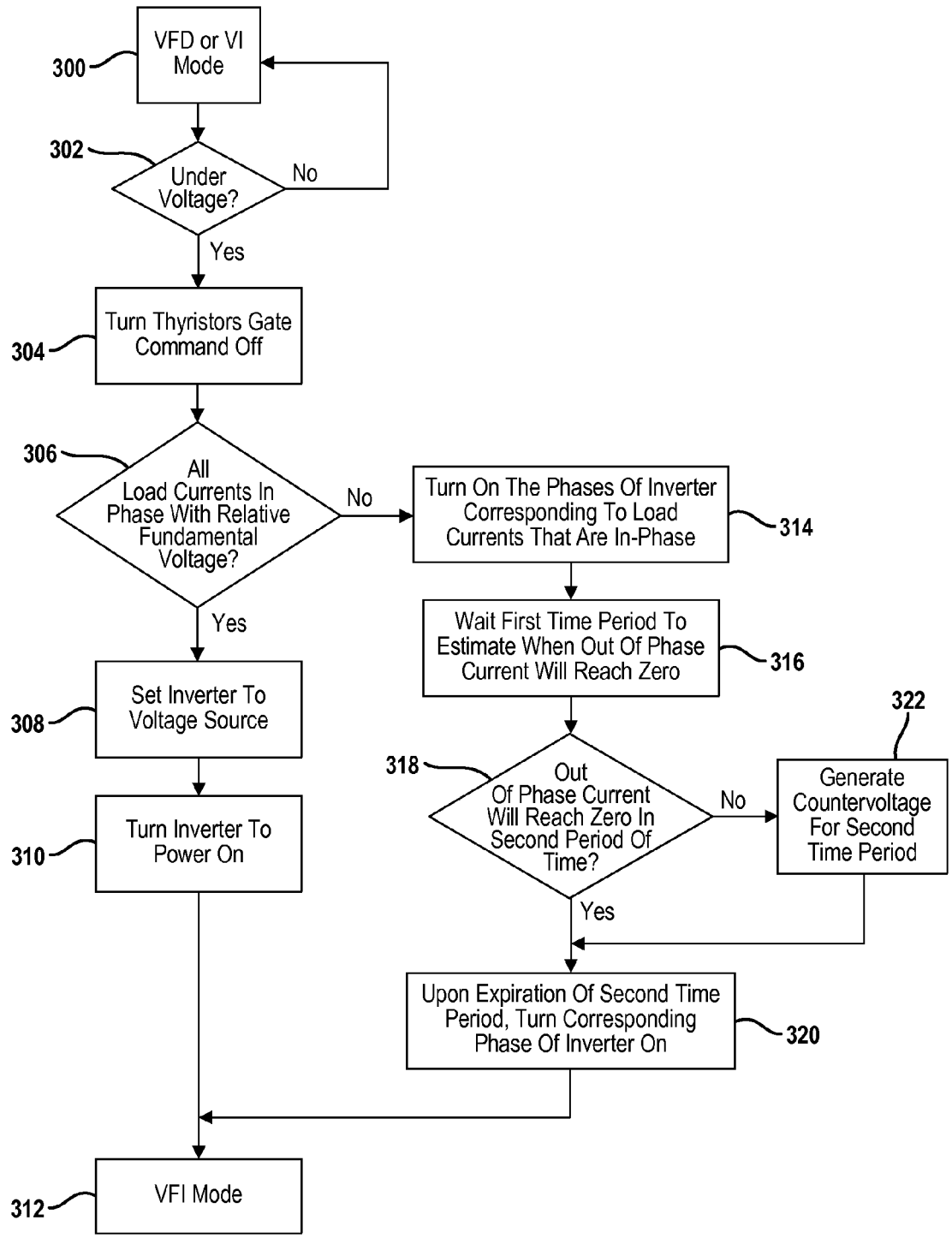
FIG. 3 is a flow chart of a software program to switch with fast transfer the UPS system of FIG. 2 from a VFD or VI mode to a VFI mode in the event of an undervoltage source line failure.
Figure 4:
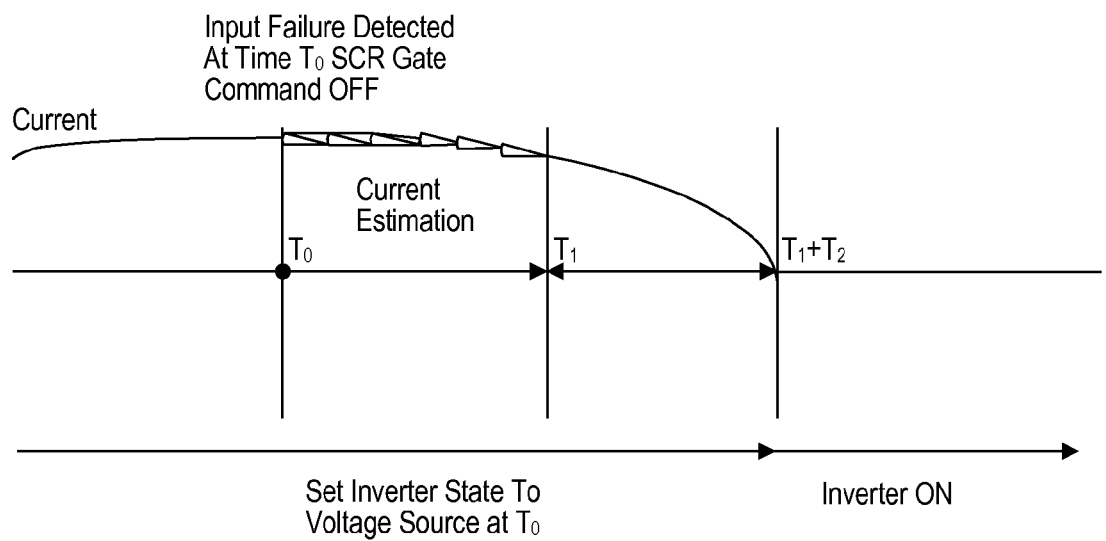
FIG. 4 is a graph showing the timing of the transition from the VI mode to the VFI mode.

FIG. 3 is a flow chart of a software program implemented in controller 108 of UPS system 200 to switch UPS system 200 from the VFD or the VI mode to the VFI mode and FIG. 4 is a graph showing the timing of the transition from the VFD or VI mode to the VFI mode. At 300, controller 108 is operating UPS system 200 is either in the VFD mode or in the VI mode. At 302, controller 108 checks whether there is an under-voltage on secondary power source 122. If controller 108 detects an under-voltage, at 304 it turns off all the thyristors 132 in static transfer switch 110' and at 306 checks to see if all the load currents (the currents in each of the phases of the load) are in phase with the relative fundamental voltage (the voltage of secondary power source 122). If all the currents are in phase with the relative fundamental voltage, at 308 controller 108 then sets the state of inverter 104 to a voltage source and at 310, turns inverter 104 power on by switching the semiconductor switching devices of inverter 104 to provide the requisite output power. At 312, controller 108 operates UPS system 312 in the VFI mode.

If a current in any of the phases is not in phase with the relative fundamental voltage, at 314 controller 108 waits the first period time period $T_1$ (2 ms by way of example and not of limitation) in order to estimate when any out of phase current will reach zero. If at 316 controller 108 determines that the estimate was that this current will reach zero within second time period $T_2$ (3 ms by way of example and not of limitation) of when the undervoltage was detected, controller 108 at 318 upon expiration of the second time period $T_2$ switches the phases of inverter 104 on (operating it as a voltage source) and at 312, operates UPS system 200 in the VFI mode. If at 316 controller 108 determines that the estimate was that this out of phase current will take more than the second time period $T_2$ to reach zero, at the end of the first time period $T_1$ the controller 108 at 322 operates the corresponding phase of inverter 104 to provide a counter voltage for the second time period $T_2$ (by way of example and not of limitation) in order to attempt to turn off the applicable thyristor 132. Inductor 202 in series with the thyristors 132 of each phase in static transfer switch 110' limits the current in the inverter phase being operated to provide the counter voltage while that inverter phase generates the counter voltage to un-polarize the applicable thyristor 132. At the expiration of the second time period $T_2$, controller 108 branches to 318 where it turns the phases of inverter 104 on (operating it as a voltage source) and at 312, operates UPS system 200 in the VFI mode.

In each case when switching UPS system 200 from the VFD mode to the VFI mode or the VI mode to the VFI mode, that transition from when the undervoltage is detected to when UPS system 200 starts operating in the VFI mode is no more than $T_1+T_2$ (which in the illustrative embodiment described, is no more than 5 ms, by way of example and not of limitation).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An uninterruptible power supply (UPS) system operable between a higher efficiency mode and a lower efficiency mode, comprising:
   an inverter;
   a secondary power source;
   a switch module including at least one switch, the switch module connected between the secondary power source and a load;
   an inductor connected in series between the secondary power source and the switch module; and
   a controller configured to operate the UPS in one of the higher efficiency mode or the lower efficiency mode, wherein the controller is configured to switch from the higher efficiency mode to the lower efficiency mode upon detection of an undervoltage in the secondary power source, wherein upon detecting an undervoltage of the secondary power source, the controller turns off the at least one switch of the switch module; and wherein if the controller determines that a load current is not in phase with a fundamental voltage of the secondary power source, the controller waits up to a first period of time in order to estimate when a current through the switch will reach zero; and if the controller determines that the out of phase current will take longer than a second period of time to reach zero, at an end of the first period of time, the controller activates the inverter to generate a counter voltage during the second period of time to turn off the at least one switch.

2. The UPS system of claim 1 wherein the switch module includes switches arranged in a reverse connected configuration.

3. The UPS system of claim 1 wherein the controller determines whether the load current is in phase with a fundamental voltage of the secondary power source.

4. The UPS system of claim 3 wherein if the controller determines that the load current is in phase with the fundamental voltage of the secondary power source, the controller sets the inverter as the source of voltage to the load.

5. The UPS system of claim 4 wherein the controller turns on the inverter to provide an output power.

6. The UPS system of claim 5 wherein the controller operates the UPS system as a double conversion UPS.

7. The UPS system of claim 1 wherein if the controller determines that an out of phase current will reach zero by the end of a second time period, the controller activates the at least one switch at the end of the second time period.

8. The UPS system of claim 7 wherein at the end of the second period of time, the controller turns on the inverter.

9. The UPS system of claim 8 wherein the controller operates the UPS system as a double conversion UPS.

10. The UPS system of claim 1 wherein upon expiration of the second time period, the controller activates the at least one switch at the end of the second time period.

11. The UPS system of claim 10 wherein at the end of the second period of time, the controller turns on the inverter.

12. The UPS system of claim 11 wherein the controller operates the UPS system as a double conversion UPS.

13. The UPS system of claim 1 wherein the at least one switch is a thyristor.

14. The UPS system of claim 1 wherein the UPS system is a three phase system and the switch module contains a plurality of switches, and one switch of the plurality is associated with a particular one of each phase.

15. The UPS system of claim 14 wherein at least one of the plurality of switches is a thyristor.

16. A transfer system for an uninterruptible power supply (UPS) system, the transfer system comprising:
at least one switch;
an inductor in series with the at least one switch and limiting current in an inverter of the UPS; and
a controller configured to wait up to a first period of time to estimate when current through the at least one switch will reach zero and controlling the inverter for a second period of time,
wherein the controller activates the inverter to generate a countervoltage during the second period of time after the controller estimates that current through the at least one switch will not reach zero at an end of the second period of time.

17. The transfer system of claim 16 wherein the controller activates the inverter at the end of the second period of time.

18. The transfer system of claim 16 wherein the controller controls the inverter by varying a duty cycle of switching devices in the inverter.

19. The transfer system of claim 16 wherein the at least one switch includes a pair of reverse connected thyristors in a phase of a static transfer switch and wherein the static transfer switch has three phases.

20. The transfer system of claim 16 wherein the inductor is connected in series between the at least one switch and a power source.

21. The transfer system of claim 16 wherein the UPS system is switchable between a higher efficiency mode and a low efficiency mode.

22. The transfer system of claim 21 wherein the higher efficiency mode is one of a VFD or VI mode and wherein the low efficiency mode is a VFI mode.

23. A method for controlling an uninterruptible power supply (UPS) system operable between a higher efficiency mode and a lower efficiency mode, comprising:
providing an inverter;
providing a secondary power source;
providing a switch module including at least one switch, the switch module connected between the secondary power source and a load;
providing an inductor connected in series between the secondary power source and the switch module;
operating the UPS in one of the higher efficiency mode or the lower efficiency mode and switching from the higher efficiency mode to the lower efficiency mode upon detecting an undervoltage in the secondary power source and upon detecting an undervoltage of the secondary power source, turning off the at least one switch of the switch module,
wherein if a load current is not in phase with a fundamental voltage of the secondary power source, waiting up to a first period of time in order to estimate when a current through the switch will reach zero; and
if an out of phase current will take longer than a second period of time to reach zero, at an end of the first period of time, generating a counter voltage in the inverter during the second period of time to turn off the at least one switch.

24. The method of claim 23 further comprising determining whether the load current is in phase with a fundamental voltage of the secondary power source.

25. The method of claim 24 wherein if the load current is in phase with the fundamental voltage of the secondary power source, setting the inverter as the source of voltage to the load.

26. The method of claim 24 further comprising turning on the inverter to provide an output power.

27. The method of claim 26 further comprising operating the UPS system as a double conversion UPS.

28. The method of claim 23 wherein at the end of the second period of time, turning on the inverter.

29. The method of claim 23 wherein upon expiration of the second time period, activating the at least one switch at the end of the second time period.

30. The method of claim 29 wherein at the end of the second period of time, turning on the inverter.

* * * * *